(12) United States Patent
Zhu et al.

(10) Patent No.: US 12,627,030 B2
(45) Date of Patent: May 12, 2026

(54) SENSING MODULE AND ELECTRONIC DEVICE

(71) Applicant: Wistron NeWeb Corporation, Hsinchu (TW)

(72) Inventors: Jia-Le Zhu, Hsinchu (TW);
Ching-Wen Chen, Hsinchu (TW);
Cheng-Wei Chiang, Hsinchu (TW);
Li-Kai Kuo, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 53 days.

(21) Appl. No.: 18/981,805

(22) Filed: Dec. 16, 2024

(65) Prior Publication Data

US 2025/0219282 A1     Jul. 3, 2025

(30) Foreign Application Priority Data

Dec. 28, 2023    (TW) ................................. 112151212

(51) Int. Cl.
| | |
|---|---|
| *H01Q 1/22* | (2006.01) |
| *G01D 5/24* | (2006.01) |
| *H01Q 1/50* | (2006.01) |
| *H01Q 1/52* | (2006.01) |

(52) U.S. Cl.
CPC ............. *H01Q 1/2266* (2013.01); *G01D 5/24* (2013.01); *H01Q 1/50* (2013.01); *H01Q 1/52* (2013.01)

(58) Field of Classification Search
CPC ............. H01F 2017/065; H01F 27/363; H01F 27/366; H01F 17/00; H03H 1/0007; H03H 2001/0042; H03H 2007/013; H03H 7/0115; H03H 7/1758; H03H 7/1766
See application file for complete search history.

(56) References Cited

U.S. PATENT DOCUMENTS

| | | | | |
|---|---|---|---|---|
| 11,962,074 | B2 * | 4/2024 | Wei ......................... | H01Q 13/10 |
| 12,455,668 | B1 * | 10/2025 | Buris ....................... | G06F 3/046 |
| 2015/0303979 | A1 | 10/2015 | Shin | |

FOREIGN PATENT DOCUMENTS

| | | |
|---|---|---|
| CN | 110931956 A | 3/2020 |
| EP | 1919027 A1 | 5/2008 |

* cited by examiner

*Primary Examiner* — Monica C King
(74) *Attorney, Agent, or Firm* — McClure, Qualey & Rodack, LLP

(57)     ABSTRACT

A sensing module includes a first antenna unit, a second antenna unit, a first inductor and a proximity sensor. The first antenna unit has at least one first communication frequency band, and the second antenna unit has at least one second communication frequency band. The first antenna unit and the second antenna unit are connected in parallel to one end of the first inductor, and the other end of the first inductor is electrically connected to the proximity sensor.

20 Claims, 6 Drawing Sheets

SENSING MODULE AND ELECTRONIC DEVICE

RELATED APPLICATIONS

This application claims the benefit of priority to Taiwan Application Number 112151212, filed on Dec. 28, 2023. The entire content of the above identified application is incorporated herein by reference.

BACKGROUND

Technical Field

The present disclosure relates to a sensing module and an electronic device, and more particularly, to a sensing module and an electronic device used for an antenna unit of communication systems.

Description of Related Art

With the development trend of today's multi-antenna communication systems, electronic devices must not only meet the characteristics of multiple communication systems, multi-antenna and multiple frequency bands, but also comply with SAR (Specific Absorption Rate) regulation relating to the level of electromagnetic waves on human body. Therefore, the circuit design relating to antennas in electronic devices and the utilization of space for antenna installation have become more challenging.

In view of the above, there is an urgent need in today's market of electronic devices containing antennas to develop a sensing module and an electronic device that can take into account the radio frequency (RF) characteristics requirements of multiple communication systems, the space utilization of antenna installation, and meet the SAR requirements at the same time.

SUMMARY

In one aspect, the present disclosure provides a sensing module that includes a first antenna unit, a second antenna unit, a first inductor and a proximity sensor. The first antenna unit has at least one first communication frequency band, and the second antenna unit has at least one second communication frequency band. The first antenna unit and the second antenna unit are connected in parallel to one end of the first inductor, and the other end of the first inductor is electrically connected to the proximity sensor.

In another aspect, the present disclosure provides an electronic device that includes the aforementioned sensing module. The sensing module further includes a common branch. The first antenna includes a first electrode branch, and one end of the first electrode branch is an open end. The second antenna unit includes a second electrode branch, and one end of the second electrode branch is an open end. The first electrode branch and the second electrode branch are connected in parallel to the common branch, and the common branch is electrically connected to the one end of the first inductor.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
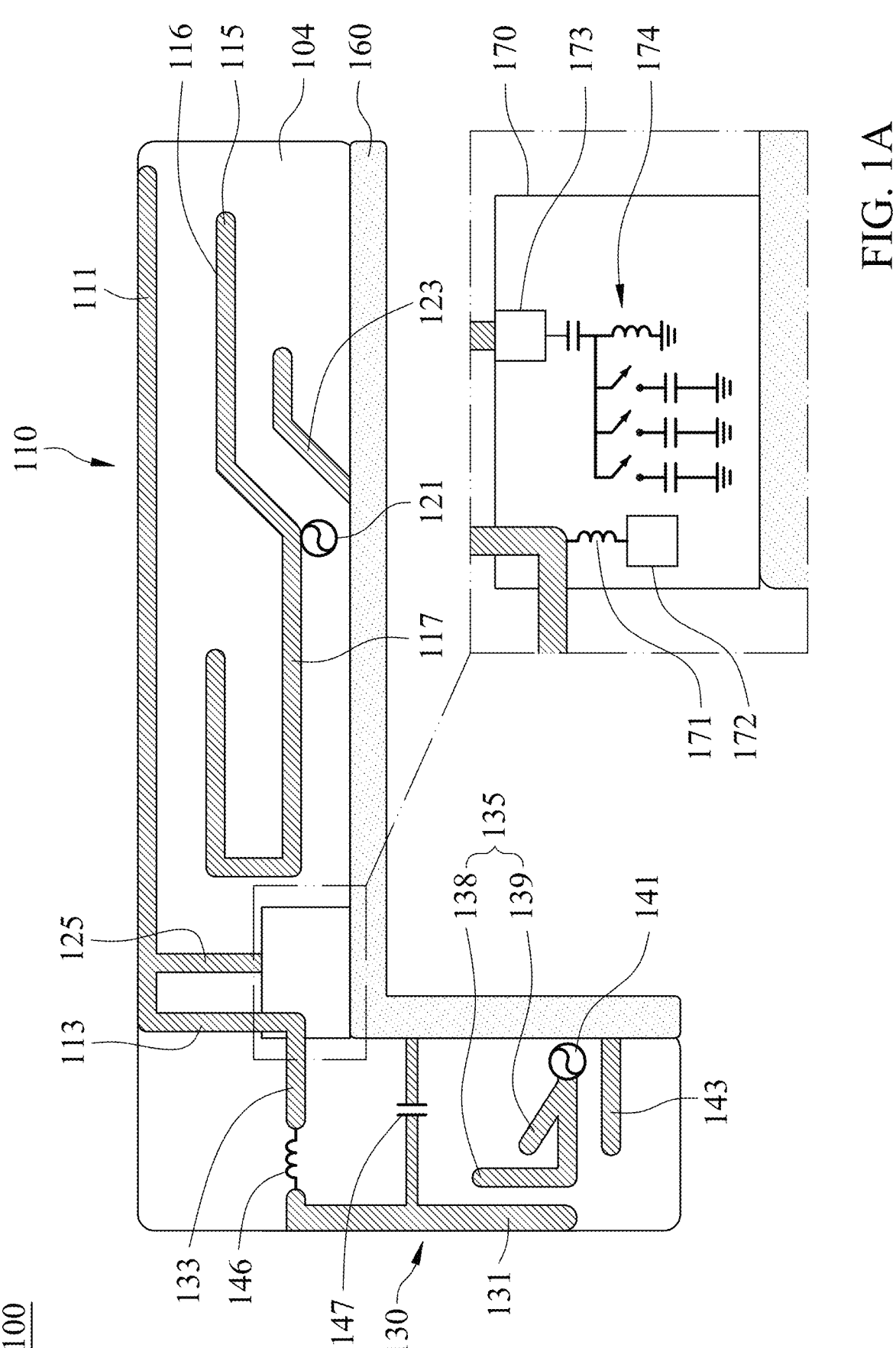
FIG. 1A is a schematic view of a sensing module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1A is a schematic view of a sensing module 100 according to a first embodiment of the present disclosure. Referring to FIG. 1A, the sensing module 100 includes a first antenna unit 110, a second antenna unit 130, a first inductor 171 and a proximity sensor 172. The first antenna unit 110 has at least one first communication frequency band, and the second antenna unit 130 has at least one second communication frequency band. The first antenna unit 110 and the second antenna unit 130 are connected in parallel to one end of the first inductor 171, and the other end of the first inductor 171 is electrically connected to the proximity sensor 172. Thus, two independent antenna units (the first antenna unit 110 and the second antenna unit 130) are physically connected at the one end of the first inductor 171 and share the proximity sensor 172 (e.g., a capacitive proximity sensor), thereby helping to save space for antenna installation and reduce costs.

In detail, the sensing module 100 can further include a dielectric carrier 104, which can be a plastic carrier or a circuit board, and the sensing module 100 may be formed by LDS (Laser Direct Structuring) method on the plastic carrier, but the manufacturing method of the sensing module 100 is not limited thereto. The first antenna unit 110, the second antenna unit 130, the first inductor 171 and the proximity sensor 172 are disposed on the dielectric carrier 104. In this way, the sensing module 100 is suitable for various internal space designs of electronic devices.

The first antenna unit 110 may include a first electrode branch 111 and a first sensing branch 113. One end of the first electrode branch 111 is an open end, and the first electrode branch 111, the first sensing branch 113 and the first inductor 171 are connected in series sequentially. Thus, the proximity sensor 172 can be used to detect proximity events near the first electrode branch 111.

The second antenna unit 130 may include a second electrode branch 131 and a second sensing branch 133. One end of the second electrode branch 131 is an open end, and the second electrode branch 131, the second sensing branch 133 and the first inductor 171 are sequentially connected in series. In this way, the proximity sensor 172 can be used to detect proximity events in the vicinity of the second electrode branch 131. Furthermore, the branch described in the present disclosure is made of conductive material and can be wires, traces, metal pads, or cables, but is not limited thereto.

The sensing module 100 may further include a switching circuit 174, which includes a switching component 173. The number of the at least one first communication frequency band can be plural, and the switching circuit 174 is configured to switch the plurality of first communication frequency bands. The first antenna unit 110 may further include a switching branch 125, and the switching branch 125 is electrically connected between the first electrode branch 111 and the switching circuit 174. In this way, the sensing module 100 can simultaneously provide proximity detection and switching between multiple first communication frequency bands.

The proximity sensor 172 and the switching circuit 174 may be integrated into an integrated unit 170, and the components in the integrated unit 170 are not limited to the proximity sensor 172 and the switching circuit 174. Specifically, the first inductor 171, the proximity sensor 172, and the switching circuit 174 are integrated into the integrated unit 170, as shown in FIG. 1A. As such, parts configuration is simplified and space is saved.

The first electrode branch 111 and the second electrode branch 131 may be perpendicular to each other. Thus, the sensing module 100 can be implemented on an L-shaped dielectric carrier 104, and the sensing module 100 can be further arranged at the corner of the electronic device (e.g., the electronic device 400 in FIG. 4) to simultaneously sense the proximity events near the perpendicular surfaces of the corner.

The lower limit (frequency) of the first communication frequency bands can be lower than the lower limit (frequency) of the second communication frequency band. Thus, the first electrode branch 111 (longer) of the first antenna unit 110 and the second electrode branch 131 (shorter) of the second antenna unit 130 are simultaneously used as proximity sensing regions, which help to solve the problem of insufficient antenna space and reduce SAR at the same time.

The first antenna unit 110 may further include a first feed branch 115, which is used for disposing a first feed point 121 thereon, and the first feed branch 115 and the first electrode branch 111 are apart from and coupled with each other. In this way, the first electrode branch 111 is used as both the communication signal path and the proximity-sensing signal path. Furthermore, the term "connection" described in the present disclosure refers to the direct or indirect physical connection between two components, and the term "couple" described herein refers to two components separated from each other and has no physical connection, but the electric field energy generated by the current of one component excites the electric field energy of the other component.

The first feed branch 115 may include a first segment 116 and a second segment 117, and the first segment 116 and the second segment 117 extend in different directions from the first feed point 121. The first antenna unit 110 may further include a first grounding branch 123, and the first segment 116 and the first grounding branch 123 are apart from and coupled with each other. In this way, the first antenna unit 110 can be used in multiple communication frequency bands.

The second antenna unit 130 may further include a second feed branch group 135, which includes a long branch 138 and a short branch 139, and the length of the long branch 138 is greater than the length of the short branch 139. One end of the long branch 138 and one end of the short branch 139 are electrically connected and configured for disposing a second feed point 141 thereon, and the long branch 138 and the second electrode branch 131 are apart from and coupled with each other. Specifically, the short branch 139 extends in a linear direction, and the long branch 138 is apart from and coupled with the second electrode branch 131 after being bent at a right angle, as shown in FIG. 1A. The second antenna unit 130 may further include a second grounding branch 143, and at least one of the long branch 138 and the short branch 139 is apart from and coupled with the second grounding branch 143. Specifically, the long branch 138 and the second grounding branch 143 are apart from and coupled with each other. In this way, the second electrode branch 131 is facilitated to act as both the communication signal path and the proximity-sensing signal path.

The second antenna unit 130 may further include a second inductor 146, and the second electrode branch 131, the second inductor 146 and the second sensing branch 133 are sequentially connected in series. Thus, under the condition that the first antenna unit 110 and the second antenna unit 130 are physically connected (physically connected at the one end of the first inductor 171), through a radio frequency (RF) filter circuit including the second inductor 146, the communication signals of the first antenna unit 110 and the second antenna unit 130 can operate independently, the proximity sensor 172 can act correspondingly to the first antenna unit 110 and the second antenna unit 130, respectively, and the communication signal and the proximity-sensing signal do not interfere with each other.

The sensing module 100 may further include a grounding unit 160, which may specifically include a conductive foam. The second antenna unit 130 may further include a capacitor 147, which is electrically connected between the second electrode branch 131 and the grounding unit 160. In this way, the RF filter circuit including the capacitor 147 helps to provide better filtering. In addition, another RF filter circuit (not shown) can also be included in the integrated unit 170 to enhance the filtering effect.

Figure 1B:
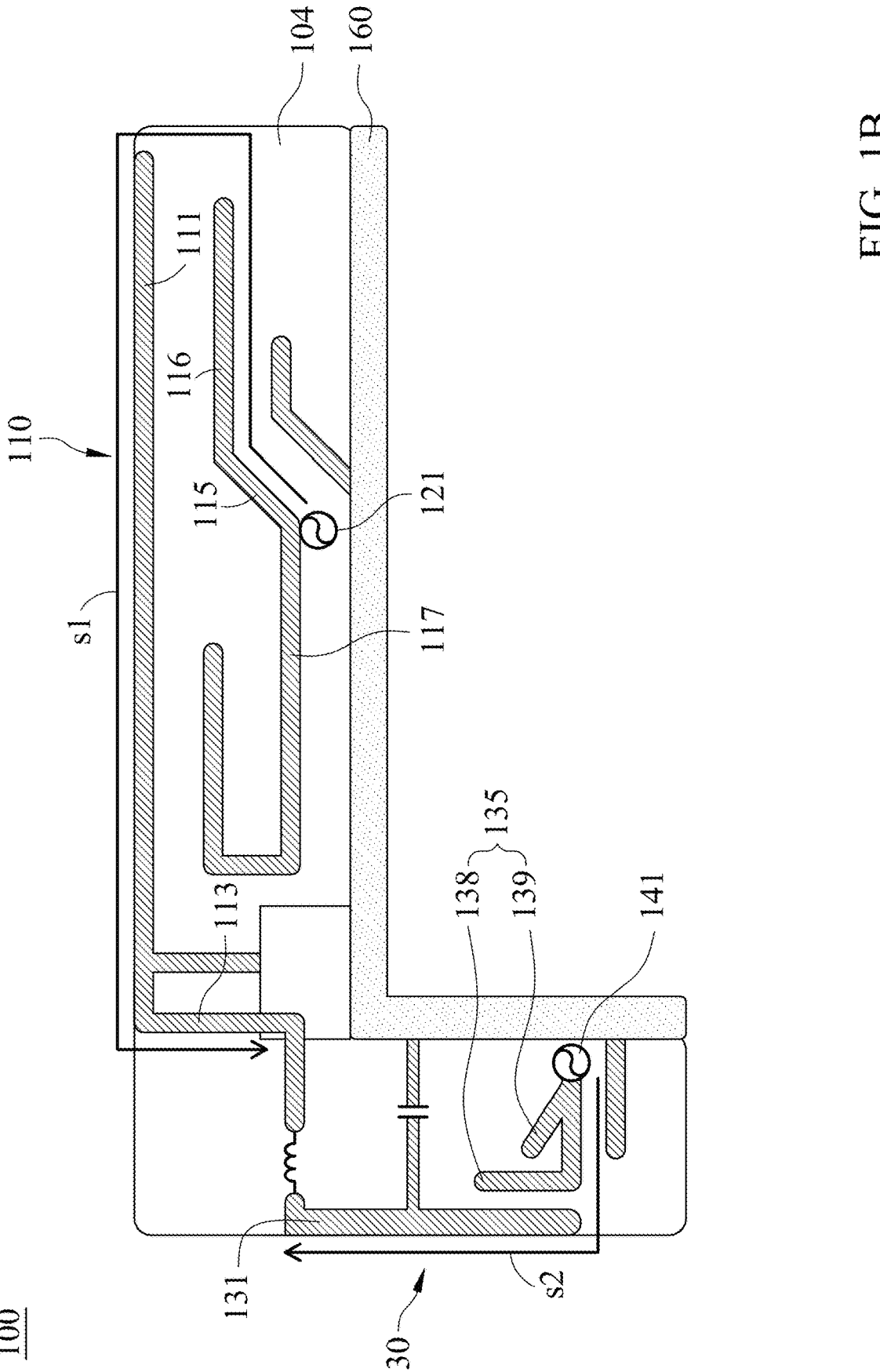
FIG. 1B is a schematic view illustrating a signal path used for communication in the sensing module shown in FIG. 1A.

FIG. 1B is a schematic view illustrating the signal paths s1 and s2 used for communication in the sensing module 100. Referring to FIG. 1A and FIG. 1B, for example, the signal path s1 of the first antenna unit 110 can be the signal path for frequency 617 MHz in LTE communication system, the signal path s2 of the second antenna unit 130 can be the signal path for frequency 1400 MHz in the MIMO communication system, and the signals on the signal path s1 and signal path s2 do not interfere with each other.

Figure 1C:
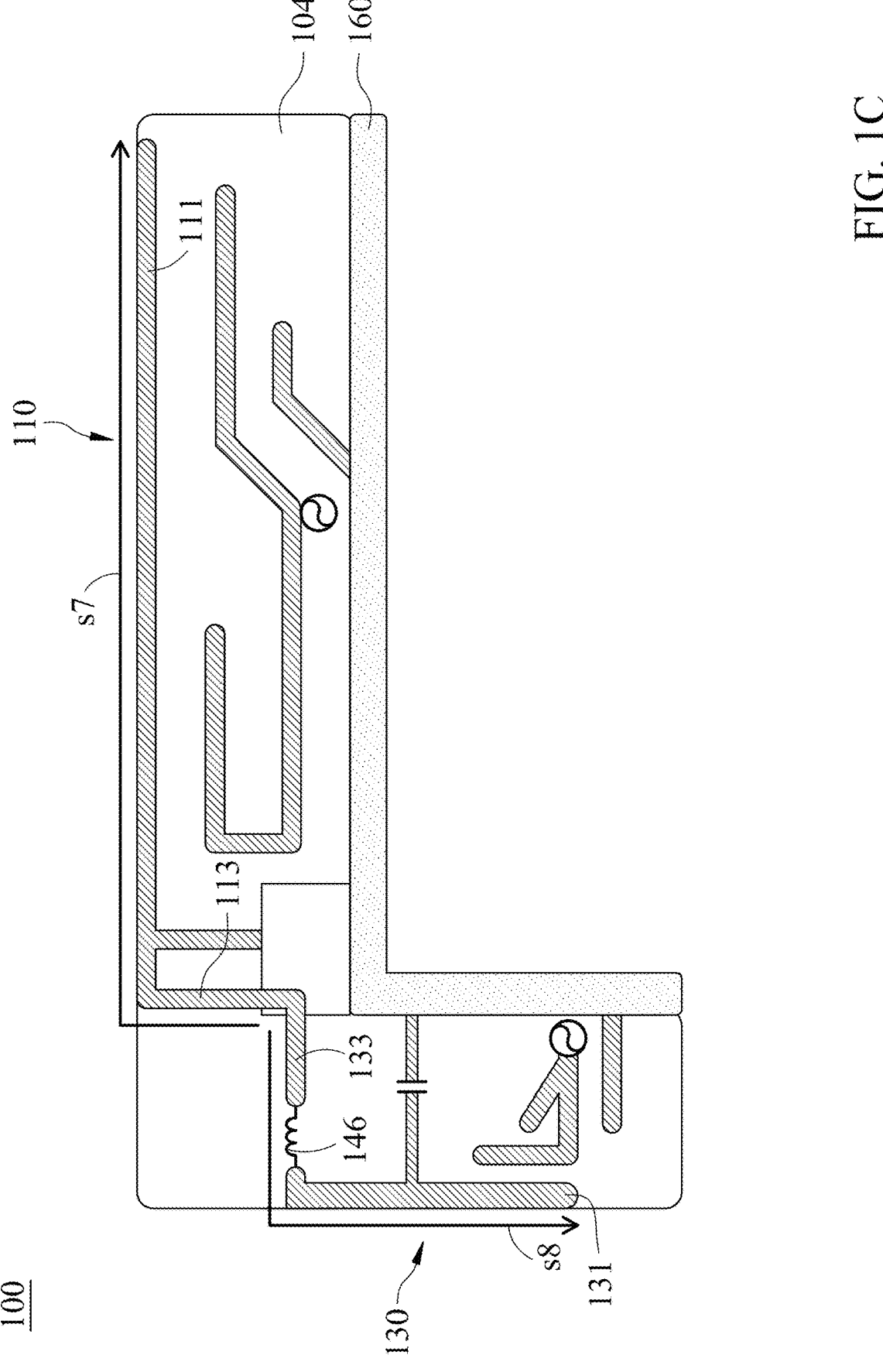
FIG. 1C is a schematic view illustrating a signal path used for proximity sensing in the sensing module shown in FIG. 1A.

FIG. 1C is a schematic view illustrating the signal paths S7 and S8 used for proximity sensing in the sensing module 100 shown in FIG. 1A. Referring to FIG. 1A and FIG. 1C, specifically, the proximity sensor 172 can determine a proximity event near the first electrode branch 111 through the signal path s7 and also determine a proximity event near the second electrode branch 131 through the signal path s8, and the signals on the signal path s7 and the signal path s8 do not interfere with each other.

Figure 2:
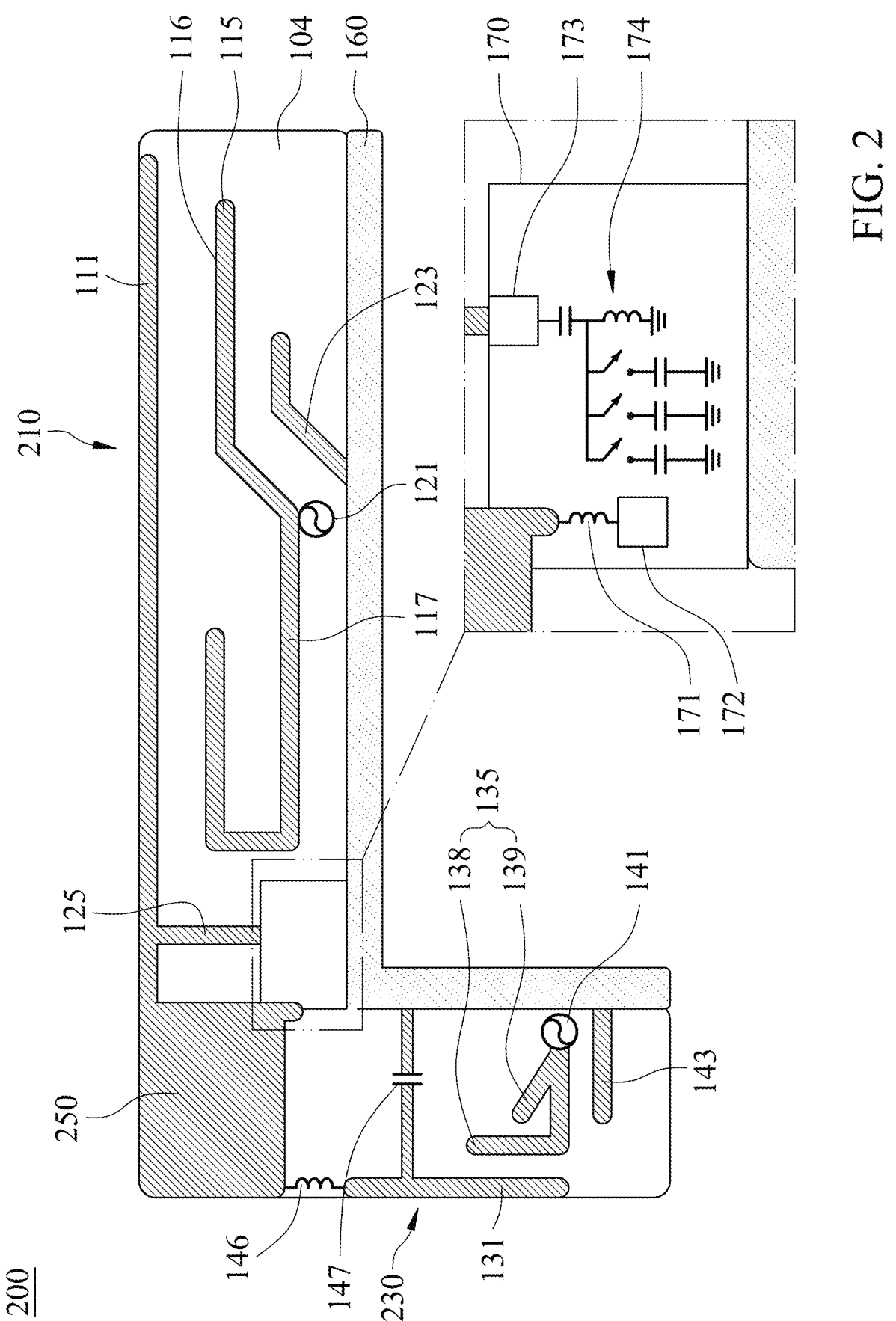
FIG. 2 is a schematic view of a sensing module according to a second embodiment of the present disclosure.

FIG. 2 is a schematic view of a sensing module 200 according to a second embodiment of the present disclosure. Referring to FIG. 2, the sensing module 200 includes a first antenna unit 210, a second antenna unit 230, a first inductor 171 and a proximity sensor 172. The first antenna unit 210 has at least one first communication frequency band, and the second antenna unit 230 has at least one second communication frequency band. The first antenna unit 210 and the second antenna unit 230 are indirectly connected in parallel at one end of the first inductor 171, and the other end of the first inductor 171 is electrically connected to the proximity sensor 172.

In detail, the sensing module 200 further includes a common branch 250. The first antenna unit 210 includes a first electrode branch 111, and one end of the first electrode branch 111 is an open end. The second antenna unit 230 includes a second electrode branch 131, and one end of the second electrode branch 131 is an open end. The first electrode branch 111 and the second electrode branch 131 are connected in parallel to the common branch 250. Specifically, the first electrode branch 111 is directly connected to the common branch 250, and the second electrode branch 131 is connected to the common branch 250 through the second inductor 146. The common branch 250 is electrically connected to the one end of the first inductor 171. In this way, the sensing module 200 according to the present disclosure provides design flexibility while saving antenna installation space and reducing costs.

In detail, the common branch 250 is a rectangular pad made of metal material. As such, the sensing module 200 can be used in limited spaces. Furthermore, the shape of the common branch of the sensing module according to the present disclosure is not limited to rectangular.

The main difference between the sensing module 200 of the second embodiment and the sensing module 100 of the first embodiment is that the first sensing branch 113 and the second sensing branch 133 are replaced by the common branch 250 to electrically connect to the proximity sensor 172, therefore, other details about the sensing module 200 of the second embodiment may refer to those of the sensing module 100 of the first embodiment, and will not be described in detail herein. It should be noted that the lengths and widths of the branches in the sensing modules 100 and 200, and the parameter values of the components thereof can be different according to the requirements.

Figure 3:
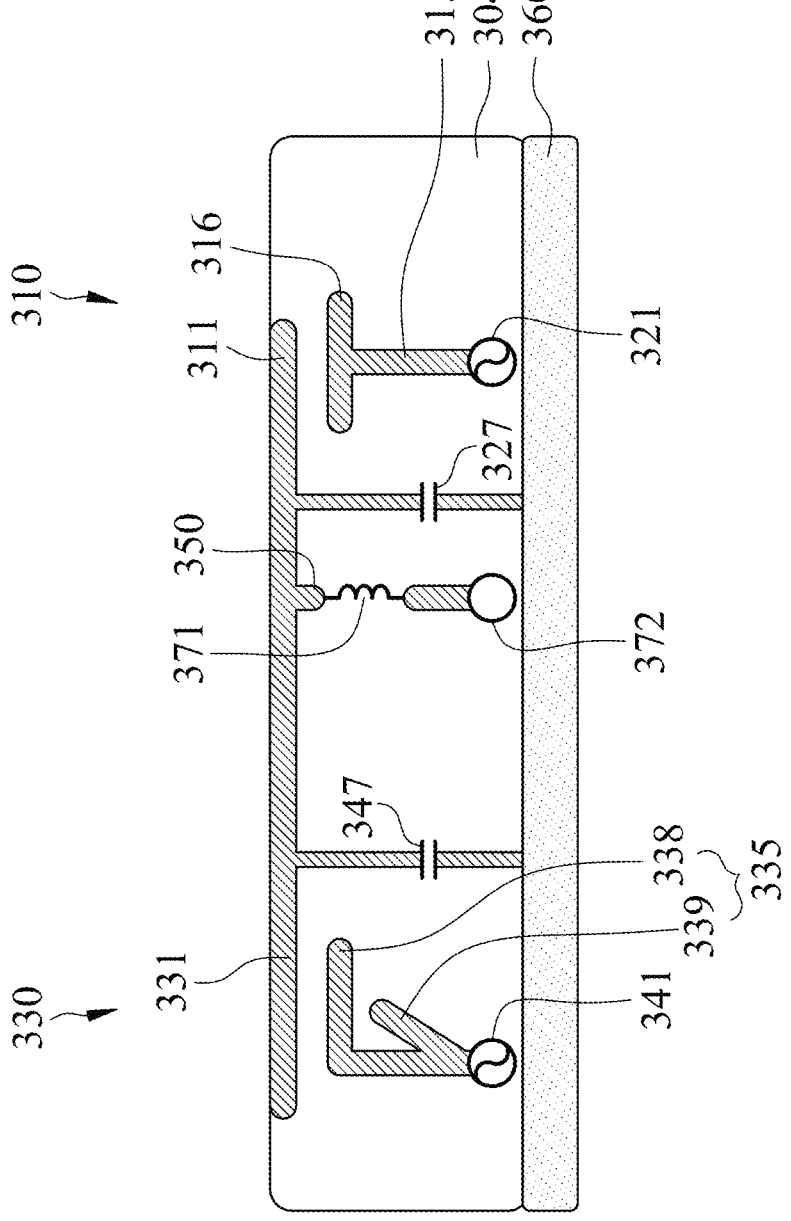
FIG. 3 is a schematic view of a sensing module according to a third embodiment of the present disclosure.

FIG. 3 is a schematic view of a sensing module 300 according to a third embodiment of the present disclosure. Referring to FIG. 3, the sensing module 300 includes a first antenna unit 310, a second antenna unit 330, a first inductor 371 and a proximity sensor 372. The first antenna unit 310 has at least one first communication frequency band, and the second antenna unit 330 has at least one second communication frequency band. The first antenna unit 310 and the second antenna unit 330 are indirectly connected in parallel to one end of the first inductor 371, and the other end of the first inductor 371 is electrically connected to the proximity sensor 372.

In detail, the sensing module 300 further includes a dielectric carrier 304, which is a plastic carrier or a circuit board, and the first antenna unit 310, the second antenna unit 330, the first inductor 371 and the proximity sensor 372 are disposed on the dielectric carrier 304.

The sensing module 300 further includes a common branch 350. The first antenna unit 310 includes a first electrode branch 311, and one end of the first electrode branch 311 is an open end. The second antenna unit 330 includes a second electrode branch 331, and one end of the second electrode branch 331 is an open end. The first electrode branch 311 and the second electrode branch 331 are directly connected in parallel to the common branch 350, and the common branch 350 is electrically connected to the one end of the first inductor 371. Furthermore, the first electrode branch 311 and the second electrode branch 331 are specifically arranged in a straight line to detect proximity events at both ends of a plane. According to other embodiments of the present disclosure, the first electrode branch and the second electrode branch may be arranged in a straight line, perpendicular to each other, or at any desired angle.

The first antenna unit 310 further includes a first feed branch 315 and a coupling branch 316. One end of the first feed branch 315 is configured for disposing the first feed point 321 thereon. The coupling branch 316 is connected to the other end of the first feed branch 315 and is perpendicular to the first feed branch 315, and the coupling branch 316 is apart from and coupled with the first electrode branch 311. In this way, the first electrode branch 311 is used as both the communication signal path and the proximity-sensing signal path.

The second antenna unit 330 further includes a second feed branch group 335, which includes a long branch 338 and a short branch 339, and the length of the long branch 338 is greater than the length of the short branch 339. One end of the long branch 338 and one end of the short branch 339 are electrically connected and configured for disposing the second feed point 341 thereon. Specifically, the short branch 339 extends in the linear direction. The long branch 338 is apart from and coupled with the second electrode branch 331 after being bent at a right angle, as shown in FIG. 3.

The sensing module 300 further includes a grounding unit 360. The first antenna unit 310 further includes a capacitor 327 electrically connected between the first electrode branch 311 and the grounding unit 360. The second antenna unit 330 further includes a capacitor 347 electrically connected between the second electrode branch 331 and the grounding unit 360. As such, the filtering effect is provided.

Figure 4:
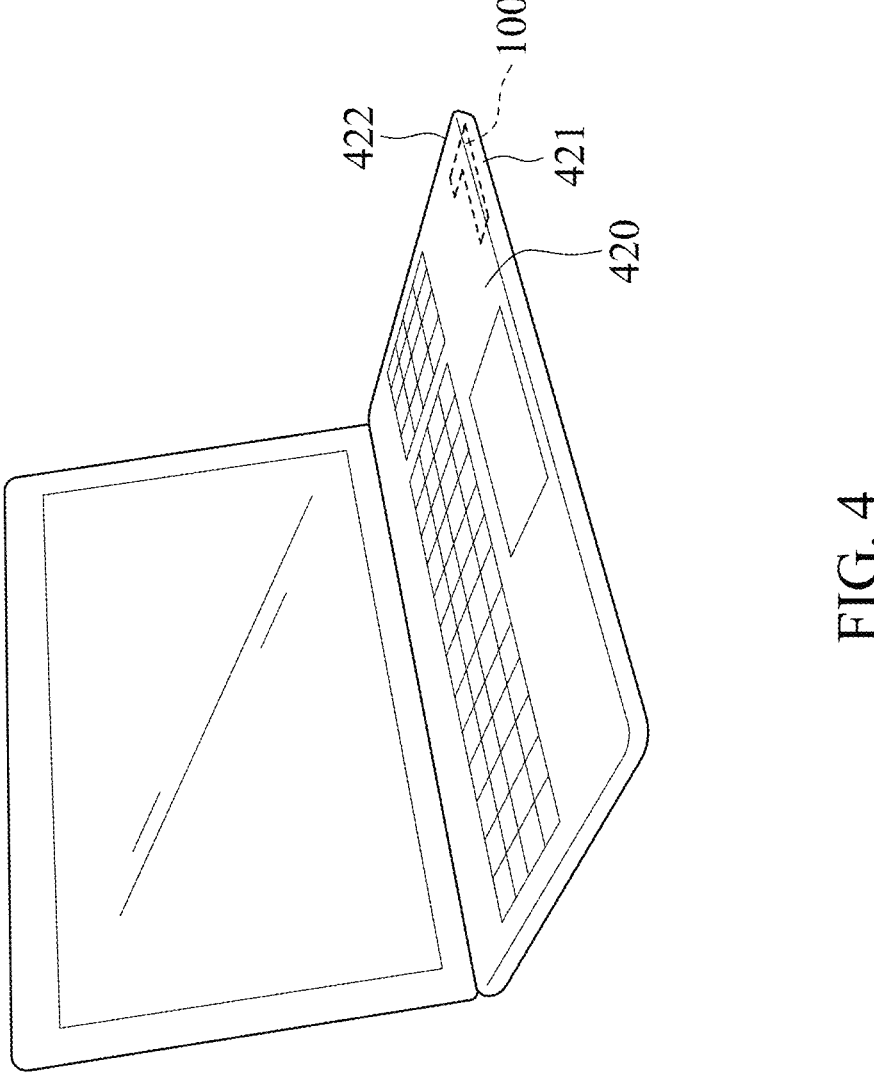
FIG. 4 is a schematic view of an electronic device according to a fourth embodiment of the present disclosure.

FIG. 4 is a schematic view of an electronic device 400 according to a fourth embodiment of the present disclosure. Referring to FIG. 1A and FIG. 4, the electronic device 400 includes a sensing module of the present disclosure, such as the sensing module 100 of the first embodiment, and the electronic device 400 may be a notebook computer, but is not limited thereto. In this way, the sensing module of the present disclosure not only can facilitate to pass the SAR test of electronic devices, but also be installed in a variety of electronic devices with limited space while reducing costs.

In detail, the electronic device 400 may further include a housing 420, and the housing 420 includes outer surfaces 421 and 422 that are adjacent to each other, for example, the outer surfaces 421 and 422 are perpendicular surfaces at the corners, and the first electrode branch 111 and the second electrode branch 131 are adjacent to the outer surfaces 421 and 422, respectively. Thus, the sensing module 100 helps the electronic device 400 to set up antennas for at least two communication systems in a limited space and simultaneously act as the proximity-sensing electrodes for at least two SAR detection surfaces, so as to achieve better antenna space utilization efficiency.

Furthermore, the first antenna unit 110 and the second antenna unit 130 are respectively applied to two different wireless communication systems, for example, the first antenna unit 110 is applied to the LTE communication system, and the second antenna unit 130 is applied to the MIMO communication system. In this way, the communication frequency bands of the first antenna unit 110 and the second antenna unit 130 may be partially overlapped but operate independently of each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensing module comprising:
a first antenna unit having at least one first communication frequency band;
a second antenna unit having at least one second communication frequency band;
a first inductor; and
a proximity sensor;
wherein the first antenna unit and the second antenna unit are connected in parallel to one end of the first inductor, and the other end of the first inductor is electrically connected to the proximity sensor.

2. The sensing module according to claim 1, wherein the first antenna unit comprises a first electrode branch and a first sensing branch, one end of the first electrode branch is an open end, and the first electrode branch, the first sensing branch and the first inductor are connected in series sequentially.

3. The sensing module according to claim 2, wherein the second antenna unit comprises a second electrode branch and a second sensing branch, one end of the second electrode branch is an open end, and the second electrode branch, the second sensing branch and the first inductor are connected in series sequentially.

4. The sensing module according to claim 3, wherein the first electrode branch and the second electrode branch are perpendicular to each other.

5. The sensing module according to claim 3, wherein the second antenna unit further comprises a second inductor, and the second electrode branch, the second inductor and the second sensing branch are connected in series sequentially.

6. The sensing module according to claim 3, further comprising:
a grounding unit;
wherein the second antenna unit further comprises a capacitor electrically connected between the second electrode branch and the grounding unit.

7. The sensing module according to claim 3, wherein the second antenna unit further comprises a second feed branch group comprising a long branch and a short branch, a length of the long branch is greater than a length of the short branch, one end of the long branch and one end of the short branch are electrically connected and configured for disposing a second feed point thereon, and the long branch and the second electrode branch are apart from and coupled with each other.

8. The sensing module according to claim 7, wherein the second antenna unit further comprises a second grounding branch, and at least one of the long branch and the short branch is apart from and coupled with the second grounding branch.

9. The sensing module according to claim 2, wherein the first antenna unit further comprises a first feed branch for disposing a first feed point thereon, and the first feed branch and the first electrode branch are apart from and coupled with each other.

10. The sensing module according to claim 9, wherein the first feed branch comprises a first segment and a second segment, and the first segment and the second segment extend in different directions from the first feed point;
wherein the first antenna unit further comprises a first grounding branch, and the first segment and the first grounding branch are apart from and coupled with each other.

11. The sensing module according to claim 2, further comprising:
a switching circuit comprising a switching component, wherein a number of the at least one first communication frequency band is plural, and the switching circuit is configured to switch the plurality of first communication frequency bands;
wherein the first antenna unit further comprises a switching branch, and the switching branch is electrically connected between the first electrode branch and the switching circuit.

12. The sensing module according to claim 11, wherein the proximity sensor and the switching circuit are integrated into an integrated unit.

13. The sensing module according to claim 11, wherein a lower limit of the plurality of first communication frequency bands is lower than a lower limit of the at least one of the second communication frequency band.

14. The sensing module according to claim 1, further comprising:
a common branch;
wherein the first antenna unit comprises a first electrode branch, one end of the first electrode branch is an open end, the second antenna unit comprises a second electrode branch, and one end of the second electrode branch is an open end;
wherein the first electrode branch and the second electrode branch are connected in parallel to the common branch, and the common branch is electrically connected to the one end of the first inductor.

15. The sensing module according to claim 14, wherein the common branch is a rectangular pad.

16. The sensing module according to claim 14, further comprising:
a grounding unit;
wherein the first antenna unit further comprises a capacitor electrically connected between the first electrode branch and the grounding unit.

17. The sensing module according to claim 1, further comprising:

a dielectric carrier, wherein the dielectric carrier is a plastic carrier or a circuit board, and the first antenna unit, the second antenna unit, the first inductor and the proximity sensor are disposed on the dielectric carrier.

18. An electronic device comprising:

a sensing module according to claim 14.

19. The electronic device according to claim 18, further comprising:

a housing comprising two outer surfaces adjacent to each other, wherein the first electrode branch and the second electrode branch are adjacent to the two outer surfaces, respectively.

20. The electronic device according to claim 18, wherein the first antenna unit and the second antenna unit are respectively applied to two different wireless communication systems.

\* \* \* \* \*